United States Patent
Millard et al.

(10) Patent No.: US 8,301,521 B2
(45) Date of Patent: Oct. 30, 2012

(54) MECHANISM FOR TRACKING TRAFFIC STATISTICS ON A PER PACKET BASIS TO ENABLE VARIABLE PRICE BILLING

(75) Inventors: Thomas Alan Millard, Cary, NC (US); Francis Edward Noel, Jr., Durham, NC (US); Rosemary Venema Slager, Cary, NC (US); Norman Clark Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2940 days.

(21) Appl. No.: 10/218,958

(22) Filed: Aug. 12, 2002

(65) Prior Publication Data
US 2003/0093341 A1 May 15, 2003

Related U.S. Application Data

(60) Provisional application No. 60/333,088, filed on Nov. 14, 2001.

(51) Int. Cl.
*G07F 19/00* (2006.01)
*H04M 15/00* (2006.01)

(52) U.S. Cl. .............. 705/34; 705/35; 705/40
(58) Field of Classification Search ............ 705/34, 705/35, 40
See application file for complete search history.

(56) References Cited

U.S. PATENT DOCUMENTS

| | | | |
|---|---|---|---|
| 5,508,817 A | 4/1996 | Kunigami | 358/402 |
| 5,745,884 A | 4/1998 | Carnegie et al. | 705/34 |
| 6,035,281 A | 3/2000 | Crosskey et al. | 705/14 |
| 6,069,890 A | 5/2000 | White et al. | 370/352 |
| 6,085,179 A | 7/2000 | Halm | 705/400 |
| 6,128,601 A | 10/2000 | Van Horne et al. | 705/34 |
| 6,137,869 A | 10/2000 | Voit et al. | 379/114 |
| 6,208,977 B1 | 3/2001 | Hernandez et al. | 705/34 |

(Continued)

FOREIGN PATENT DOCUMENTS

EP 1014619 A1 12/1998

(Continued)

OTHER PUBLICATIONS

"iFlow Accountant," *Silicon Access Networks*, via Internet at www.siliconaccess.com, pp. 1-5.

(Continued)

*Primary Examiner* — F. Zeender
*Assistant Examiner* — Christopher Buchanan
(74) *Attorney, Agent, or Firm* — Robert A. Voigt, Jr.; Winstead, P.C.

(57) ABSTRACT

A method, system and computer program product for generating variable price billing whereby a customer may balance its data traffic in response to such billing. A subsystem in an edge gateway may extract the packet header from a copy of a received packet of data associated with a session between a customer and a server and generate a key based on the extracted packet header. The key may be used to index into a table that may store pointers to particular statistics records associated with particular sessions. Once the subsystem identifies the statistics record associated with the current session, the subsystem may execute a per packet statistics update for the statistics record associated with the session. A per packet statistics update may include one or more of the following: time stamping arrival of the packet, updating packet count, updating byte count, determining transfer rate, determining distance packet traveled.

31 Claims, 7 Drawing Sheets

U.S. PATENT DOCUMENTS

| | | | |
|---|---|---|---|
| 6,788,946 B2 * | 9/2004 | Winchell et al. | 455/459 |
| 6,973,038 B1 * | 12/2005 | Narendran | 370/238 |
| 2002/0177431 A1 * | 11/2002 | Hamilton et al. | 455/406 |
| 2002/0178118 A1 * | 11/2002 | Hamilton et al. | 705/40 |
| 2003/0012147 A1 * | 1/2003 | Buckman et al. | 370/260 |
| 2004/0076143 A1 * | 4/2004 | Lee | 370/352 |
| 2006/0056415 A1 * | 3/2006 | Lee et al. | 370/392 |

FOREIGN PATENT DOCUMENTS

| | | |
|---|---|---|
| EP | 1065838 A2 | 5/2000 |
| JP | 2000101574 | 4/2000 |

OTHER PUBLICATIONS

"Infranet, Customer Management and Billing Platform for Convergent services," *Portal*, via Internet at www.portal.com, pp. 1-4.

James Smith et al. "Reduction of Transmission Bandwidth Use in Telecommunications By Providing Minimum Bandwidth State During on Hold Conditions," Pending.

\* cited by examiner

MECHANISM FOR TRACKING TRAFFIC STATISTICS ON A PER PACKET BASIS TO ENABLE VARIABLE PRICE BILLING

This application claims the benefit and priority date of the provisional application Ser. No. 60/333,088 filed Nov. 14, 2001.

CROSS REFERENCE TO RELATED APPLICATION

The present invention is related to the following U.S. Patent Application which is incorporated herein by reference:
Ser. No. 10/218,730 entitled "Variable Pricing Structure for Transmitting Packets Across a Communications Link" filed Aug. 12, 2002.

TECHNICAL FIELD

The present invention relates to the field of communication networks, and more particularly to a mechanism for gateways, e.g., Internet Service Providers, to track traffic statistics on a per packet basis to enable variable price billing.

BACKGROUND INFORMATION

A communications network may generally be defined as a collection of computers or computing systems which interact or transmit data between one network device, e.g., client, router, gateway, and another network device, e.g., server. The connection between each network device, e.g., client, router, gateway, may be referred to as a "communication link." For example, a communications network may comprise a host machine, e.g., server computer on the Internet commonly referred to as a web server, connected to one or more computers commonly referred to as clients via the Internet. The Internet may refer to a network of networks. Users of clients, commonly referred to as customers, including businesses and individuals, may be connected to the Internet through a gateway, e.g., Internet Service Provider (ISP). The gateway may provide access to the Internet for a fixed monthly fee. That is, customers may be charged a fixed fee regardless of when the customer transfers data or the amount of data transferred by the customer.

Often times, a customer may transmit packets of data, e.g., Internet Protocol (IP) packets of data, to the gateway during peak traffic hours. That is, a customer may transmit data during peak busy times of the day and not transmit data during the off-peak times of the day. By transmitting data during peak busy times of the day, the customer may experience network congestion. Furthermore, the customer is paying for use of the communication link during off-peak times despite the fact that the customer may not use the link. That is, the link between the customer and the gateway must either be able to handle the peak rate bandwidth, at a greater cost, or the customer will face network congestion during times of peak traffic. In either circumstance, there may be significant idle bandwidth during off-peak hours.

If gateways, e.g., ISP's, were able to track traffic statistics on a per packet basis, e.g., track the number of packets transmitted per unit of time, track time of day packets are transmitted, then customers may be billed based on variable pricing, e.g., billing based at least in part on the time of day the packets of data were transmitted, billing based at least in part on the number of packets transmitted per unit of time, instead of a simple fixed fee. By being billed based on variable pricing instead of a simple fixed fee, the customer may be motivated to transmit data during off-peak times or distributed over time thereby saving money. Furthermore, by transmitting data during off-peak times, network congestion may at least in part be lessened. Furthermore, gateways may benefit by reducing capital costs based on maximizing use of the bandwidth of the communication link.

It would therefore be desirable to provide a mechanism for gateways to track traffic statistics on a per packet basis to enable variable price billing whereby a customer may balance its data traffic in response to such billing.

SUMMARY

The problems outlined above may at least in part be solved in some embodiments by generating variable price billing whereby a customer may balance its data traffic in response to such billing. An edge gateway, e.g., Internet Service Provider (ISP), may receive a packet of data, e.g., Internet Protocol (IP) packet of data, from either a customer, i.e., a client coupled to the edge gateway, or a server during a particular session between the customer and server. Upon receiving the packet, a network processor in the edge gateway may create a copy of the received packet and transmit it to what is commonly referred to herein as a network processor subsystem within the edge gateway. The network processor subsystem may extract the packet header from the received packet and generate a key based on the extracted packet header. The key may be used to index into a table that may store pointers to particular statistics records associated with particular sessions. Once the network processor subsystem identifies the statistics record associated with the current session based on the key generated, the network processor subsystem may execute a per packet statistics update for the statistics record associated with the session. A per packet statistics update may include one or more of the following: time stamping arrival of the packet, updating packet count, updating byte count, determining transfer rate, determining distance packet traveled, determining quality of service, determining type of carrier service, determining size of packet. That is, a per packet statistics update may refer to the network processor subsystem updating or collecting (if there is no data to update) certain statistics tracked in a statistics record on a per packet basis. A per packet statistics update as described above may be repeated for each received packet in the session. Upon completion of the session, the network processor subsystem may transmit the statistics record associated with the completed session to a central billing system coupled to the edge gateway. The central billing system may be configured to compute billing rates for a plurality of pricing options in a billing record based on the traffic statistics collected on a per packet basis. Each pricing option may be based upon one or more different variables including but not limited to: the number of packets transmitted per unit of time, the time the packets are transmitted, the quality of service, the traffic volume, the type of carrier service, customer attributes, the relationship between the source and destination site, the size of the packets, protocol conversions, and the number of destinations. Hence, by the gateway tracking traffic statistics on a per packet basis, variable price billing may be provided to the customer whereby the customer may balance its data traffic in response to such billing.

In one embodiment of the present invention, a method for generating a variable price billing whereby a customer may balance its data traffic in response to such billing may comprise the step of a network processor in an edge gateway receiving a packet of data from either a customer, i.e., a user of a client coupled to the edge gateway, or a server coupled to the edge gateway.

Upon receiving a packet of data from the customer, the network processor may create a copy of the packet received and forward that copy to an appropriate port coupled to what is commonly referred to herein as a network processor subsystem which may perform the following steps. In an alternative embodiment, the network processor may instead of creating a copy of the packet received and forwarding that copy to the network processor subsystem simply perform the following steps by itself.

Upon receiving the copy of the received packet, the network processor subsystem may extract the packet header in the received packet. The network processor subsystem may then determine if the received packet is a packet indicating the start of a session between the customer and the server.

If the received packet is not a packet indicating the start of a session between the customer and the server, then the network processor subsystem may generate a key, i.e., a value used to identify an entry in a table discussed below, based on the extracted packet header.

If, however, the received packet is a packet indicating the start of a session between the customer and the server, then the network processor subsystem may determine if the received packet of data is part of a billable flow. That is, the network processor subsystem may determine if the customer is to be billed based at least in part on this received packet of data and subsequent packets in this session. In one embodiment, the network processor subsystem may determine if the received packet of data is part of a billable flow based on particular sub-fields in the packet header. In an alternative embodiment, the network processor subsystem may not determine if the received packet of data is part of a billable flow but instead include those packets of data in its analysis of the session as described further below in connection with the per packet statistics update.

If the received packet of data is not part of a billable flow, then the network processor subsystem may determine if statistics are to be collected for the non-billable flow. If no statistics are to be collected for the non-billable flow, then the network processor may receive another packet of data from either the customer or the server for a particular session between the customer and the server.

If, however, the received packet of data is part of a billable flow, or if statistics are to be collected for the non-billable flow, then the network processor subsystem may generate a key, i.e., a value used to identify an entry in a table as discussed below, based on the extracted packet header. For example, the network processor subsystem may generate a key by concatenating multiple sub-fields, e.g., source IP address, destination IP address, source Transmission Control Protocol (TCP) port number, destination TCP port number, within the extracted packet header.

Upon generating the key, the network processor subsystem may index into a table using the generated key. In one embodiment, the table may be configured to store entries where each entry may store a pointer. The pointer may point to a particular statistics record where the statistics record may refer to a record of tracking pertinent statistics on a particular session by the network processor subsystem. For example, the network processor subsystem may track the number of packets and/or the number of bytes received by the network processor subsystem for a particular session in the statistics record associated with that session. In another example, the network processor subsystem may track the time of the arrival of the packet by time stamping the arrival of the packet. In another example, the network processor subsystem may determine the distance the received packet traveled.

The network processor subsystem may determine if there is an entry in the table described above associated with the key generated. There may not be an entry in the table described above associated with the key generated when the packets are part of a non-billable flow that is not being monitored or when the packet is the start of a new flow as discussed further below.

If there is not an entry in the table described above associated with the key generated, then the network processor subsystem may determine if the received packet is a packet indicating the start of a session between the customer and the server. In one embodiment, the network processor subsystem may determine if the received packet is a packet indicating the start of a session between the customer and the server based on the extracted packet header. For example, the extracted packet header may indicate that the packet is a first SYN (synchronize) packet from the customer.

If the packet does not indicate the start of a session, then the network processor may receive another packet of data from either the customer or the server for a particular session between the customer and the server. This may be the case for non-billable flow packets which are not charged to the customer. Since the customer may not be charged at least in part on receiving non-billable flow packets, there may not be an entry in the table discussed above associated with the key generated. Instead, non-billable flow packets may be charged to another entity. For example, non-billable flow packets such as content, e.g., advertisement, transmitted from the server to the customer via the gateway may not be charged to the customer but instead to the owner of the server.

If, however, the packet indicates the start of a session, then the network processor subsystem may create an entry in the table described above associated with the key generated. Furthermore, if the packet indicates the start of a session, then the network processor subsystem may create a pointer to the statistics record associated with the session entered between the customer and the server. The pointer created may be stored in the created entry. In an alternative embodiment, the network processor subsystem may instead of creating a pointer to the statistics record simply create a statistics record associated with the session to be stored in the created entry.

As stated above, the network processor subsystem may determine if there is an entry in the table described above associated with the key generated. If there is an entry in the table described above associated with the key generated, then the network processor subsystem may identify the statistics record associated with the session entered between the customer and the server using a pointer in the indexed entry. In an alternative embodiment, the key may be used by the network processor subsystem to identify the statistics record associated with the session entered between the customer and the server where the statistics record is stored in the indexed entry.

Upon creating a pointer to the statistics record associated with the session entered between the customer and the server or upon identifying the statistics record associated with the session entered between the customer and the server, the network processor subsystem may execute a per packet statistics update for the statistics record associated with the session entered with the customer. A per packet statistics update may include one or more of the following: time stamping arrival of the packet, updating packet count, updating byte count, determining transfer rate, determining distance packet traveled, determining quality of service, determining type of carrier service, determining size of packet. That is, a per packet statistics update may refer to the network processor subsystem updating or collecting (if there is no data to update) certain statistics tracked in a statistics record as described above. For example, the network processor subsystem may update the current number of packets or bytes received by the network processor subsystem by incrementing a counter. In another example, the network processor subsystem may determine the distance the received packet traveled in the per packet statistics update.

A determination may then be made by the network processor subsystem as to whether the session entered between the customer and the server is completed. If the session is not completed, then the edge gateway may receive another packet of data from either the customer or the server. If the session is complete, then the network processor subsystem may transmit the statistics record associated with the completed session to a central billing system coupled to the edge gateway. In an alternative embodiment, the network processor subsystem may periodically transmit one or more statistics records associated with one or more sessions to the central billing system instead of transmitting a session record upon completion of the session associated with that session record. It is noted that in the alternative embodiment, the network processor subsystem may not transmit a statistics record unless the session associated with that statistics record is complete. The central billing system may be configured to compute billing rates for a plurality of pricing options in a billing record based on the traffic statistics collected on a per packet basis. Each pricing option may be based upon one or more different variables including but not limited to: the number of packets transmitted per unit of time, the time the packets are transmitted, the quality of service, the traffic volume, the type of carrier service, customer attributes, the relationship between the source and destination site, the size of the packets, protocol conversions, and the number of destinations. Hence, by the gateway tracking traffic statistics on a per packet basis, variable price billing may be provided to the customer whereby the customer may balance its data traffic in response to such billing.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
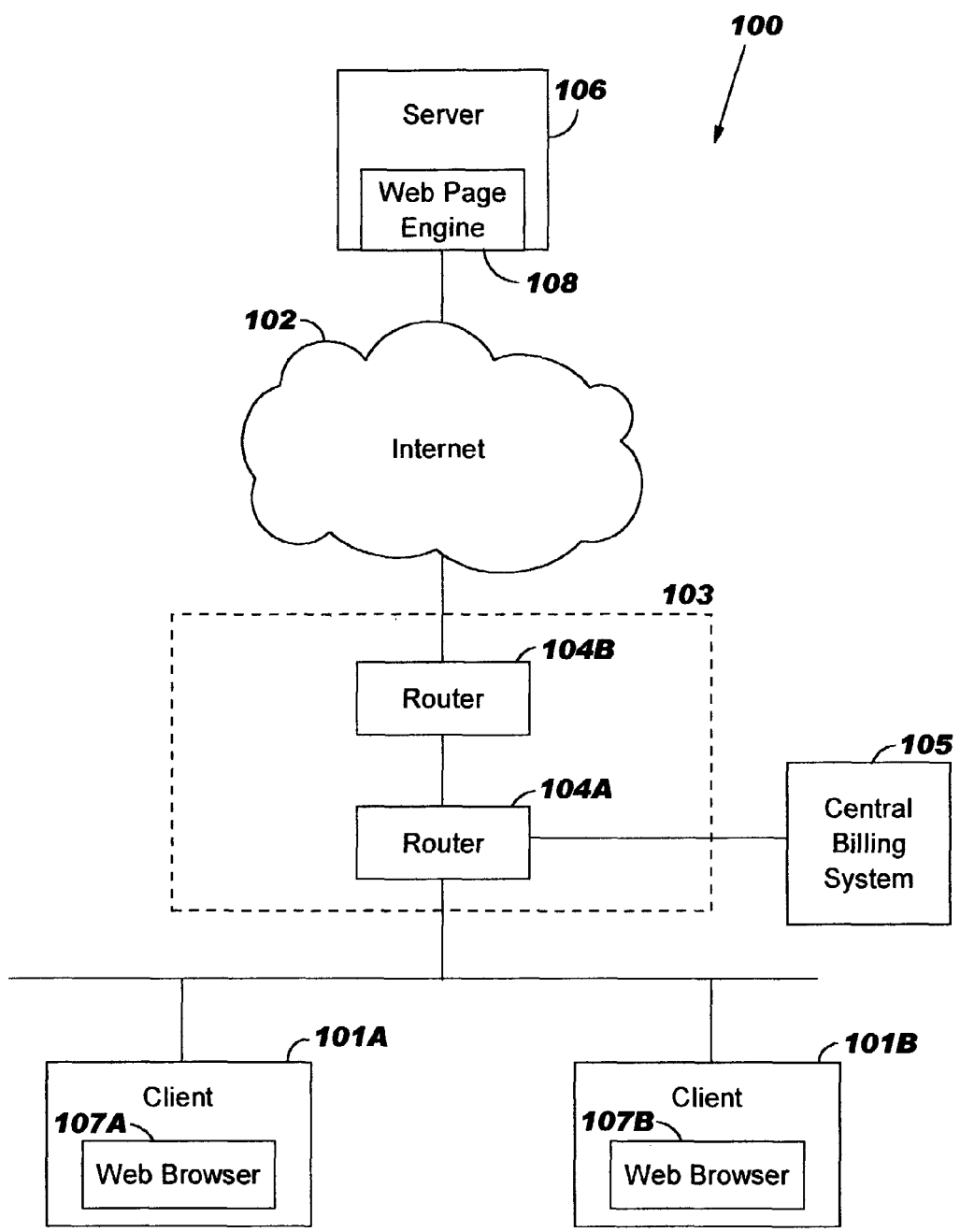
FIG. 1 illustrates a network system configured in accordance with the present invention.

FIG. 1—Network System

FIG. 1 illustrates an embodiment of a network system 100 in accordance with the present invention. Network system 100 may comprise one or more clients 101A-B coupled to the Internet 102 via a gateway subnet 103 thereby being able to communicate with a server 106, e.g., web server, coupled to the Internet 102. The Internet 102 may refer to a network of networks. A subnet may refer to an interconnected, but independent, segment or domain of network system 100. Gateway subnet 103 may comprise one or more gateways 104A-B including gateway 104A located at the edge of gateway subnet 103 configured to generate variable price billing as discussed further below in conjunction with FIG. 6. Gateways 104A-B may be configured to provide clients 101A-B access to the Internet 102. Clients 101A-C may collectively or individually be referred to as clients 101 or client 101, respectively. A more detailed description of client 101 is provided below in conjunction with FIG. 2. A more detailed description of server 106 is provided further below in conjunction with FIG. 3. Gateways 104A-B may collectively or individually be referred to as gateways 104 or gateway 104, respectively. A more detailed description of gateway 104 is provided further below in conjunction with FIG. 5. Network system 100 may further comprise a control billing system 105 coupled to gateway 104, e.g., gateway 104A, configured to compute billing rates for a plurality of pricing options in a billing record for a customer, i.e., a user of client 101 including businesses and individuals, as described in greater detail further below in conjunction with FIG. 6. A more detailed description of control billing system 105 is provided further below in conjunction with FIG. 4.

It is noted that the connection between clients 101 and gateway 104 may be any medium type, e.g., wireless, wired. It is further noted that client 101 may be any type of device, e.g., wireless, Personal Digital Assistant (PDA), portable computer system, cell phone, personal computer system, workstation, Internet appliance, configured with the capability of connecting to the Internet 102 and consequently communicating with server 106. It is further noted that network system 100 may comprise any number of gateway subnets 103 where each gateway subnet 103 may comprise any number of gateways 104. It is further noted that network system 100 may be any type of system that has at least one client 101, at least one gateway 104, the Internet 102, at least one server 106 and a central billing system 105. It is further noted that network system 100 is not to be limited in scope to any one particular embodiment. For example, central billing system 105 may be located either externally or internally of gateway subnet 103.

Referring to FIG. 1, each client 101A-B may comprise a web browser 107A-B, respectively, which may be configured for communicating with the Internet 102 and for reading and executing web pages. Browsers 107A-C may collectively or individually be referred to as browsers 107 or browser 107, respectively. While the illustrated client engine is a web browser 107, those skilled in the art will recognize that other client engines may be used in accordance with the present invention.

Server 106, e.g., web server, may comprise a web page engine 108 for maintaining and providing access to an Internet web page which is enabled to forward static web pages to web browser 107 of client 101. Web pages are typically formatted as a markup language file, for example, HyperText Markup Language (HTML) or Extended Markup Language (XML).

Figure 2:
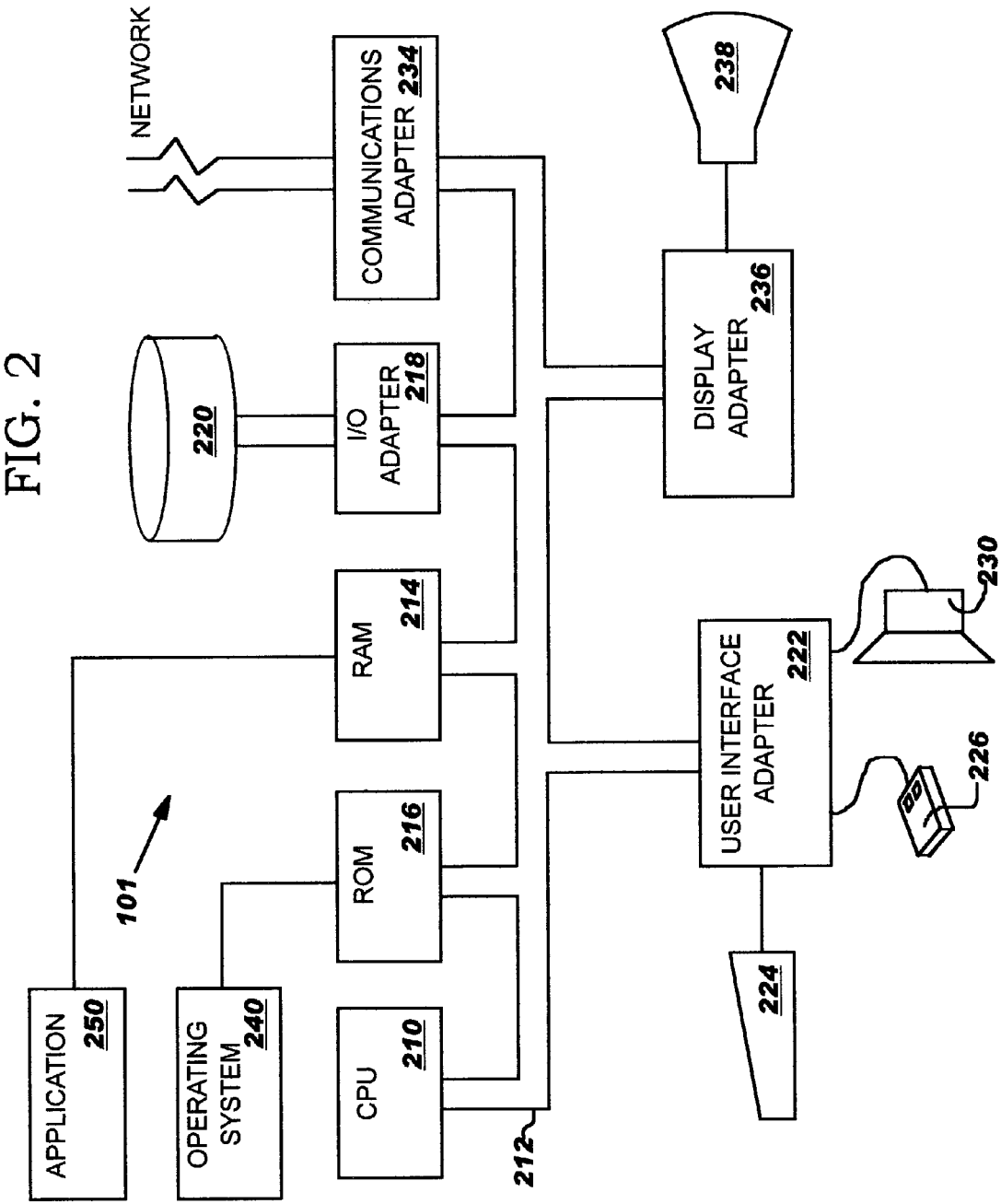
FIG. 2 illustrates a client in the network system configured in accordance with the present invention.

FIG. 2—Hardware Configuration of Client

FIG. 2 illustrates a typical hardware configuration of client 101 (FIG. 1) which is representative of a hardware environment for practicing the present invention. Client 101 may have a central processing unit (CPU) 210 coupled to various other components by system bus 212. An operating system 240 may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, web browser 107, a program for entering a session with server 106 (FIG. 1). Read-Only Memory (ROM) 216 may be coupled to system bus 212 and include a basic input/output system ("BIOS") that controls certain basic functions of client 101. Random access memory (RAM) 214 and Input/Output (I/O) adapter 218 may also be coupled to system bus 212. It should be noted that software components including operating system 240 and application 250 may be loaded into RAM 214 which may be the client's 101 main memory for execution. I/O adapter 218 may be a small computer system interface ("SCSI") adapter that communicates with a disk unit 220, e.g., disk drive. It is noted that web browser 107 may reside in disk unit 220 or in application 250. It is further noted that the program for entering a session with server 106 may reside in disk unit 220 or in application 250.

Referring to FIG. 2, client 101 may further comprise a communications adapter 234 coupled to bus 212. Communications adapter 234 may enable client 101 to communicate with gateway 104 (FIG. 1), the Internet 102 (FIG. 1), and server 106 (FIG. 1). I/O devices may also be connected to system bus 212 via a user interface adapter 222 and a display adapter 236. Keyboard 224, mouse 226 and speaker 230 may all be interconnected to bus 212 through user interface adapter 222. Event data may be inputted to client 101 through any of these devices. A display monitor 238 may be connected to system bus 212 by display adapter 236. In this manner, a user is capable of inputting, e.g., issuing requests to read web pages, entering a session with server 106 as discussed in conjunction with FIG. 6, to client 101 through keyboard 224 or mouse 226 and receiving output from client 101 via display 238.

Figure 3:
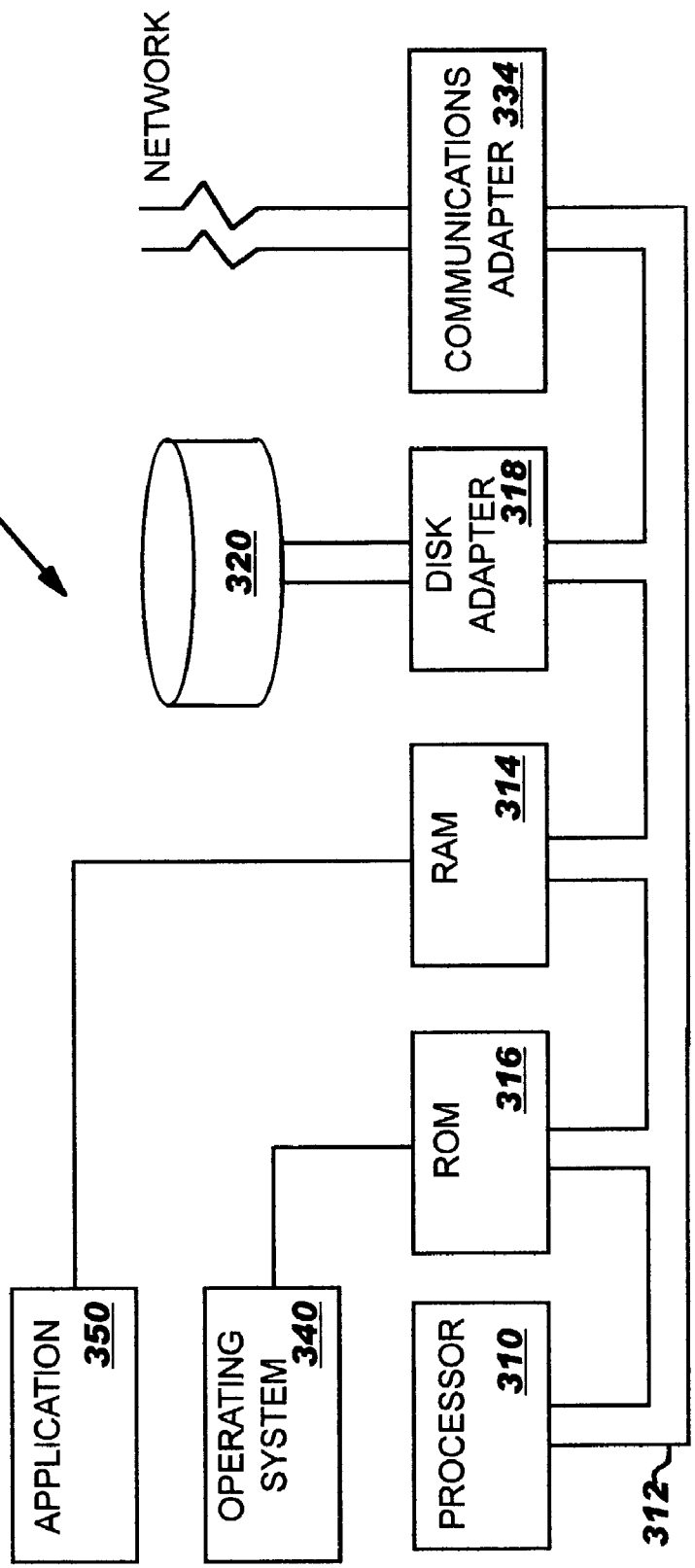
FIG. 3 illustrates a server in the network system configured in accordance with the present invention.

FIG. 3—Hardware Configuration of Server

FIG. 3 illustrates an embodiment of the present invention of server 106 (FIG. 1). Referring to FIG. 3, server 106 may comprise a processor 310 coupled to various other components by system bus 312. An operating system 340 may run on processor 310 and provide control and coordinate the function of the various components of FIG. 3. An application 350 in accordance with the principles of the present invention may run in conjunction with operating system 340 and provide calls to operating system 340 where the calls implement the various functions or services to be performed by application 350. Application 350 may include, for example, a program for operating a web site. Read-Only Memory (ROM) 316 may be coupled to system bus 312 and include a basic input/output system ("BIOS") that controls certain basic functions of server 106. Random access memory (RAM) 314, disk adapter 318 and communications adapter 334 may also be coupled to system bus 312. RAM 314 may be server's 106 main memory for execution. Disk adapter 318 may be a small computer system interface ("SCSI") adapter that communicates with disk units 320, e.g., disk drive. Communications adapter 334 may interconnect bus 312 with server 106 enabling server 106 to communicate with gateway 104 (FIG. 1) and client 101 (FIG. 1).

Figure 4:
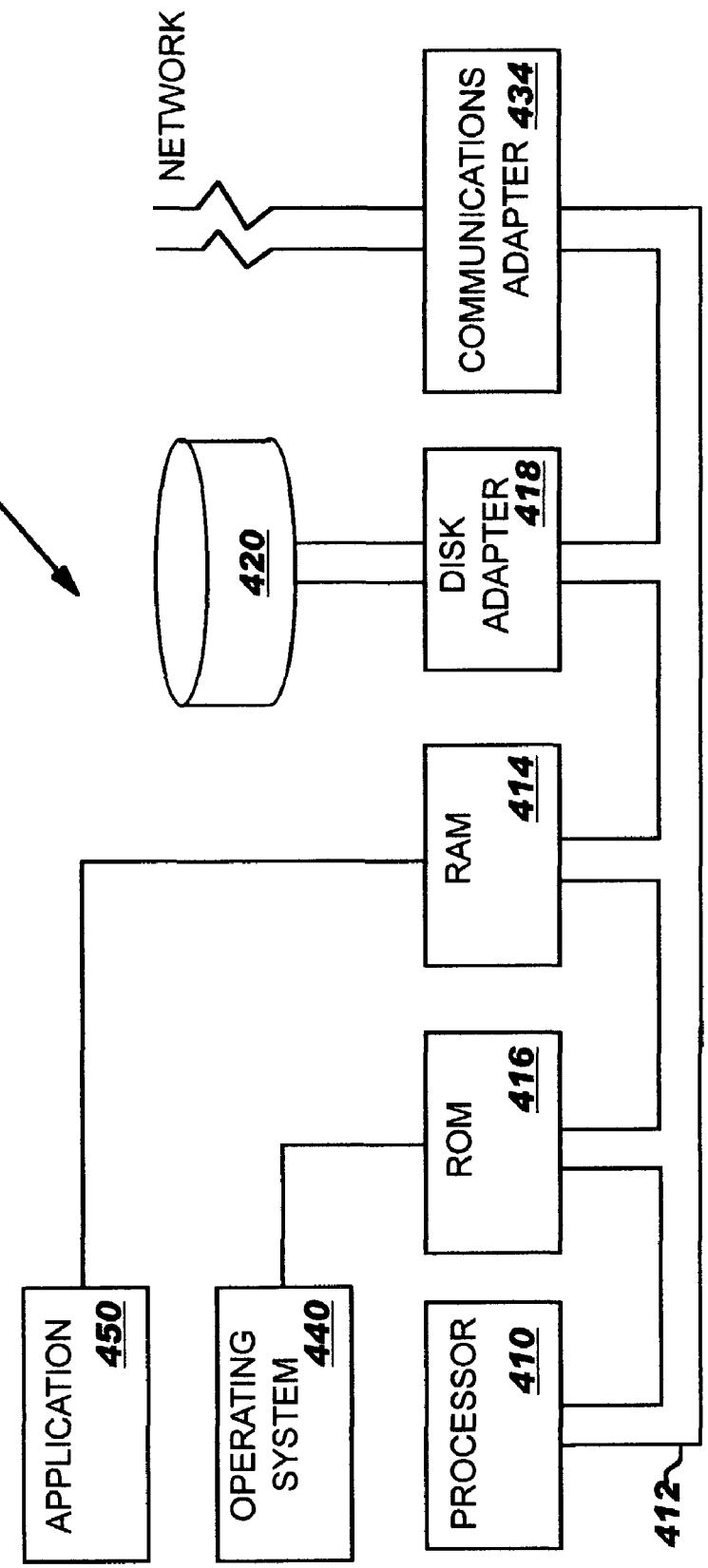
FIG. 4 illustrates a central billing system in the network system configured in accordance with the present invention.

FIG. 4—Hardware Configuration of Central Billing System

FIG. 4 illustrates an embodiment of the present invention of central billing system 105 (FIG. 1). Referring to FIG. 4, central billing system 105 may comprise a processor 410 coupled to various other components by system bus 412. An operating system 440 may run on processor 410 and provide control and coordinate the function of the various components of FIG. 4. An application 450 in accordance with the principles of the present invention may run in conjunction with operating system 440 and provide calls to operating system 440 where the calls implement the various functions or services to be performed by application 450. Application 450 may include, for example, a program for computing billing rates for a plurality of pricing options in a billing record for a customer as discussed in conjunction with FIG. 6. Read-Only Memory (ROM) 416 may be coupled to system bus 412 and include a basic input/output system ("BIOS") that controls certain basic functions of central billing system 105. Random access memory (RAM) 414, disk adapter 418 and communications adapter 434 may also be coupled to system bus 412. RAM 414 may be central billing system's 105 main memory for execution. Disk adapter 418 may be a small computer system interface ("SCSI") adapter that communicates with disk units 420, e.g., disk drive. It is noted that the program for computing billing rates for a plurality of pricing options in a billing record for a customer, as discussed in conjunction with FIG. 6, may reside in disk unit 420 or in application 450. Communications adapter 434 may interconnect bus 412 with central billing system 105 enabling central billing system 105 to communicate with gateway 104 (FIG. 1), e.g., gateway 104A.

Figure 5:
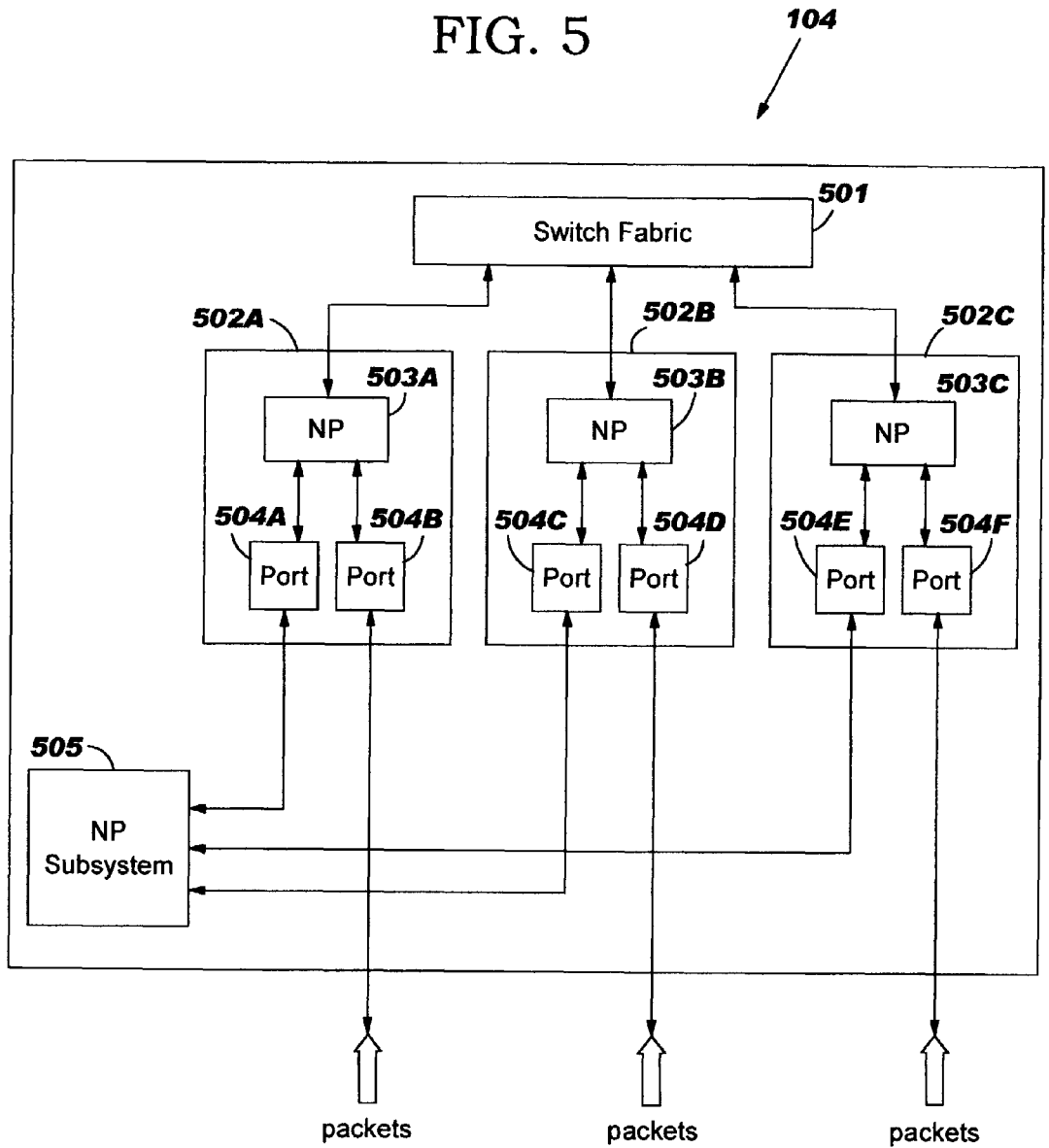
FIG. 5 illustrates a gateway in the network system configured in accordance with the present invention.

FIG. 5—Hardware Configuration of Gateway

FIG. 5 illustrates an embodiment of the present invention of gateway 104 (FIG. 1). An edge gateway 104, i.e., gateway 104 located at the edge of gateway subnet 103 such as gateway 104A, may be configured to receive packets of data from either client 101 (FIG. 1), e.g., client 101A, or server 106 (FIG. 1) that may be directed to another particular network device, e.g., gateway 104B, server 106, client 101, in network 100 (FIG. 1). Gateway 104 may comprise a switch fabric 501 configured to switch packets of data among the various blades 502A-C coupled to switch fabric 501. Blade 502A may comprise a network processor 503A coupled with one or more ports 504A-B. Blade 502B may comprise a network processor 503B coupled with one or more ports 504C-D. Blade 502C may comprise a network processor 503C coupled with one or more ports 504E-F. Blades 502A-C may collectively or individually be referred to as blades 502 or blade 502, respectively. Network processors 503A-C may collectively or individually be referred to as network processors 503 or network processor 503, respectively. Network processors 503, e.g., IBM™ PowerNP NP4GS3, may refer to processors that combine programmable, configurable and special function circuitry for networking applications. Ports 504A-F may collectively or individually be referred to as ports 504 or port 504, respectively. Each port 504 may be coupled to either a network device, e.g., gateway, server, router, in network system 100 or to what is commonly referred to herein as a network processor subsystem 505 in gateway 104. Network processors 503 may be configured to receive packets of data to be processed via ports 504 from network devices in the network system. It is noted that gateway 104 may comprise any number of blades 502 comprising any number of network processors 503 and ports 504. It is further noted that any number of ports 504 may be coupled to a network device or to network processor subsystem 505. It is further noted that gateway 104 is not to be limited in scope to any one particular embodiment. For example, the functionality of blades 502 including network processors 503 and ports 504 may be implemented in hardware such as in an Application Specific Integrated Circuit (ASIC).

Figure 6:
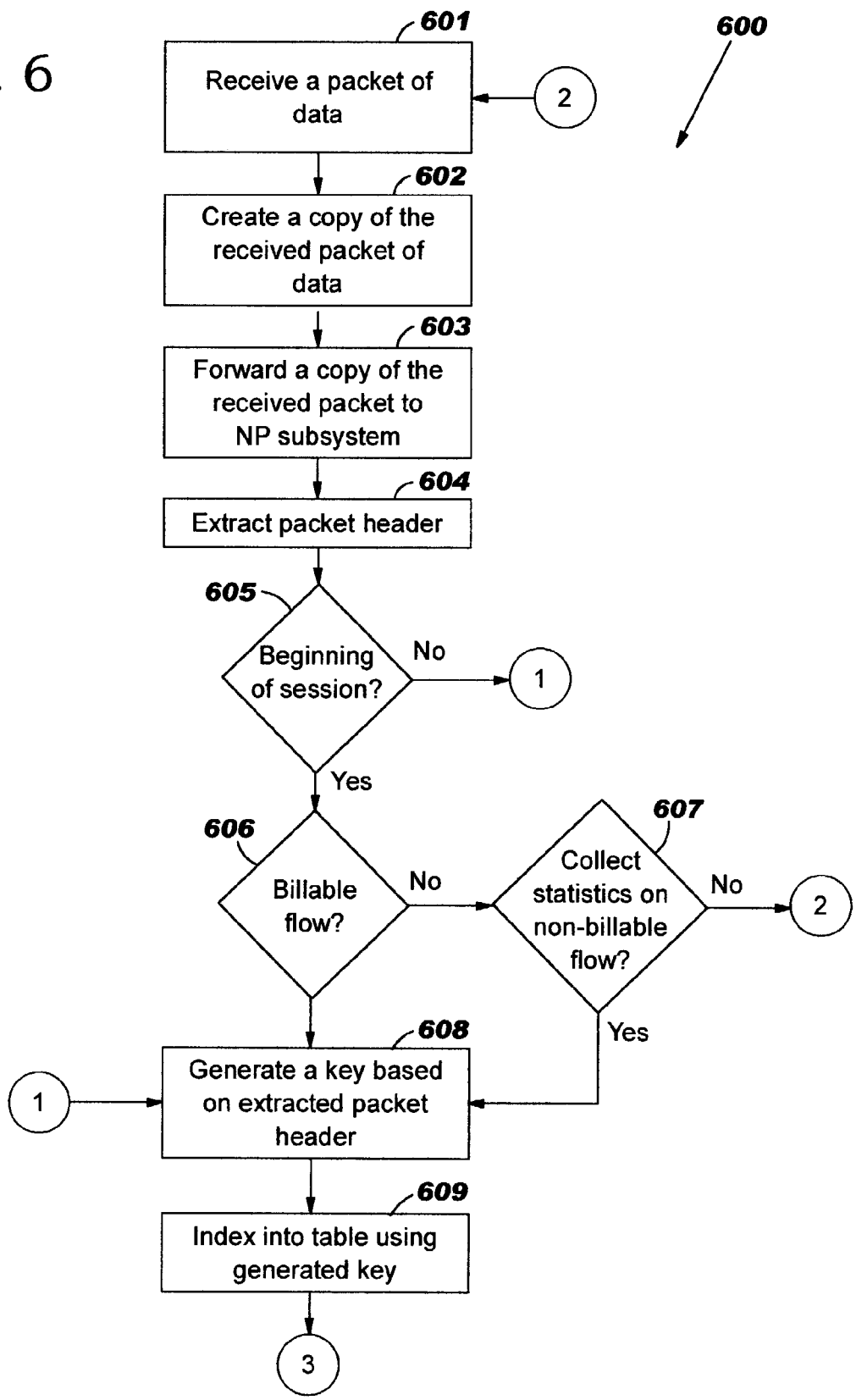
FIG. 6 is a flowchart of a method for a gateway to generate variable price billing in accordance with the present invention.
Figure 6:
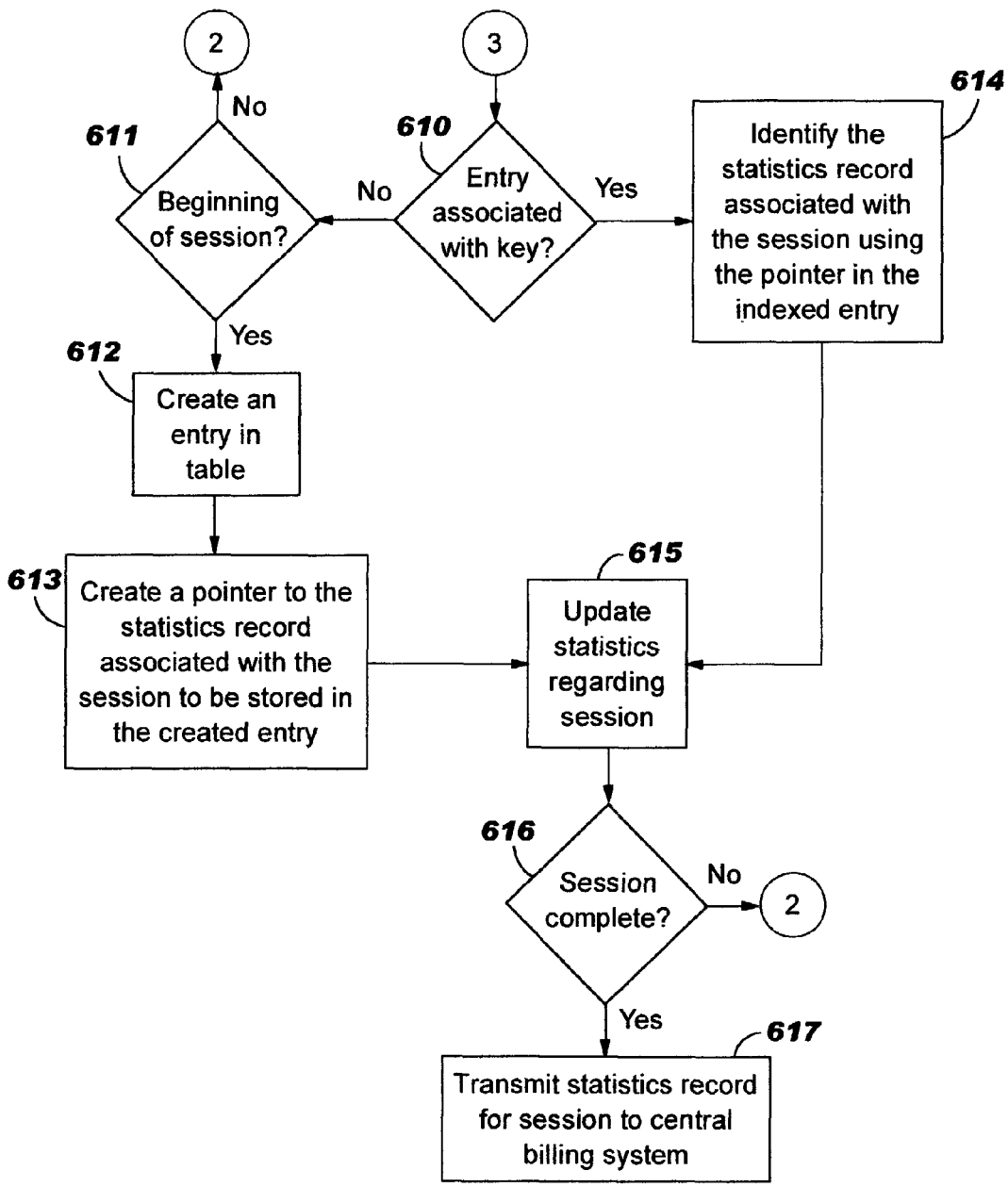

Referring to FIG. 5, network processor 503 may be configured to copy a received packet and forward the copy to an appropriate port 504 coupled to network processor subsystem 505 as described in conjunction with FIG. 6. The forwarded copy may be transmitted by network processor 503 via the appropriate port 504 to network processor subsystem 505 to perform a per packet statistics update as discussed in conjunction with FIG. 6.

Network processor subsystem 505 may be configured in one embodiment to comprise a memory (not shown), e.g., non-volatile memory, to store a program to perform the steps of a method for generating variable price billing as described below in conjunction with FIG. 6. The memory (not shown), e.g., non-volatile memory, in network processor subsystem 505 may further be configured to store a table used to identify a statistics record associated with a session as described in conjunction with FIG. 6. Network processor subsystem 505 may further comprise counters implemented either in software or hardware configured to count the number of packets or bytes received by gateway 104 on a per packet basis. Network processor subsystem 505 may further comprise a processor (not shown) coupled to the memory (not shown). The processor (not shown) may be configured to execute the instructions of the program. It is further noted that the steps of the method performed by the program mentioned above may in an alternative embodiment be implemented in hardware such as in an ASIC.

FIG. 6—Method for Generating Variable Price Billing

FIG. 6 is a flowchart of one embodiment of the present invention of a method 600 for gateway 104 (FIG. 1), e.g., gateway 104A, to generate variable price billing instead of billing a simple fixed fee to access the Internet 102 (FIG. 1). As stated in the Background Information section, if gateways, e.g., Internet Service Providers (ISP's), were able to track traffic statistics on a per packet basis, e.g., track the number of packets transmitted per unit of time, track time of day packets are transmitted, then customers may be billed based on variable pricing, e.g., billing based at least in part on the time of day the packets of data were transmitted, billing based at least in part on the number of packets transmitted per unit of time, instead of a simple fixed fee. By being billed based on variable pricing instead of a simple fixed fee, the customer may be motivated to transmit data during off-peak times or distributed over time thereby saving money. Furthermore, by transmitting data during off-peak times, network congestion may at least in part be lessened. Furthermore, gateways may benefit by reducing capital costs based on maximizing use of the bandwidth of the communication link. It would therefore be desirable to provide a mechanism for gateways to track traffic statistics on a per packet basis to enable variable price billing whereby a customer may balance its data traffic in response to such billing. Method 600 is a method for enabling an edge gateway 104, e.g., gateway 104A, to generate variable price billing whereby a customer may balance its data traffic in response to such billing. It is noted that even though the following discusses edge gateway 104, e.g., gateway 104A, as generating variable price billing that other gateways 104 in gateway subnet 103 may similarly be configured to generate variable price billing.

Referring to FIG. 6, in conjunction with FIGS. 1 and 5, in step 601, network processor 503 in an edge gateway 104, e.g., gateway 104A, may receive a packet of data from either a customer, i.e., a user of client 101, or server 106 for a particular session between the customer and server 106.

In step 602, network processor 503 may create a copy of the received packet of data and in step 603 forward the copy of the received packet of data to an appropriate port 504 coupled to network processor subsystem 505 to perform the following steps. In an alternative embodiment, network processor 503 may instead of creating a copy of the received packet and forwarding the copy to network processor subsystem 505 simply perform the following steps by itself. However, it may be preferable for network processor 503 to copy the received packet and forward it to network processor subsystem 505 so that network processor subsystem 505 performs the following steps in order that the design of network processor 503 is less complicated with less processing requirements.

In step 604, network processor subsystem 505 may extract the packet header in the copy of the received packet of data. In step 605, network processor subsystem 505 may determine if the received packet is a packet indicating the start of a session between the customer, i.e., user of client 101, and server 106. In one embodiment, network processor subsystem 505 may determine if the received packet is a packet indicating the start of a session between the customer and server 106 based on the extracted packet header. For example, the extracted packet header may indicate that the packet is a first SYN (synchronize) packet from the customer.

If the received packet is not a packet indicating the start of a session between the customer, i.e., user of client 101, and server 106, then network processor subsystem 505, in step 608, may generate a key, i.e., a value used to identify an entry in a table as discussed below, based on the extracted packet header. For example, network processor subsystem 505 may generate a key by concatenating multiple subfields, e.g., source IP address, destination IP address, source Transmission Control Protocol (TCP) port number, destination TCP port number, within the extracted packet header.

If the received packet is a packet indicating the start of a session between the customer, i.e., user of client 101, and server 106, then network processor subsystem 505, in step 606, may determine if the received packet of data is part of a billable flow. That is, network processor subsystem 505 may determine if the customer is to be billed based at least in part on this received packet of data and subsequent packets in this session. In one embodiment, network processor subsystem 505 may determine if the received packet of data is part of a billable flow based on particular sub-fields in the packet header. For example, the source and destination Internet Protocol (IP) address in the sub-fields of the packet header may be used to determine if the received packet of data is part of a billable flow. In an alternative embodiment, network processor subsystem 505 may not determine if the received packet of data is part of a billable flow but instead include those packets of data in its analysis of the session as described further below in step 615.

If the received packet of data is not part of a billable flow, then network processor subsystem 505, in step 607, may determine if statistics are to be collected for the non-billable flow. If no statistics are to be collected for the non-billable flow, then network processor 503 may receive another packet of data from either the customer or server 106 for a particular session between the customer and server 106 in step 601.

If, however, the received packet of data is part of a billable flow, or if statistics are to be collected for the non-billable flow, then network processor subsystem 505, in step 608, may generate a key, i.e., a value used to identify an entry in a table as discussed below, based on the extracted packet header. For example, network processor subsystem 505 may generate a key by concatenating multiple subfields, e.g., source IP address, destination IP address, source Transmission Control Protocol (TCP) port number, destination TCP port number, within the extracted packet header.

In step 609, network processor subsystem 505 may index into a table using the generated key. In one embodiment, the table may be configured to store entries where each entry may store a pointer. The pointer may point to a particular statistics record where the statistics record may refer to a record of tracking pertinent statistics on a particular session by network processor subsystem 505. For example, network processor subsystem 505 may track the number of packets and/or the number of bytes received by network processor subsystem 505 for a particular session in the statistics record associated with the session. In one embodiment, counters implemented either in software or hardware in network processor subsystem 505 may be configured to track the number of packets and/or bytes received by network processor subsystem 505 for a particular session. In another example, network processor subsystem 505 may track the time of the arrival of the packet by time stamping the arrival of the packet. In one embodiment, network processor subsystem 505 may simply time stamp the arrival of the first and last packet in the session to determine the time duration of the session. It is noted that time stamping is well known in the art and that a detailed discussion of time stamping is avoided for sake of brevity. In another example, network processor subsystem 505 may determine the distance the received packet traveled. In one embodiment, the distance the received packet traveled may be determined from the source IP address and the destination IP address in the packet header. Each IP address may be associated with a geographic location stored in a table where the table may be stored in a server located either internally or externally of gateway subnet 103. Since each IP address may be associated with a geographic location, the distance the received packet traveled may be determined. It is noted that network processor subsystem 505 may track other types of information in a statistics record such as the quality of service to be performed on the received packets, the size of the packets, protocol conversions, etc., than illustrative above in order to provide the customer with variable pricing options. It is further noted that embodiments implementing network processor subsystem 505 tracking other types of information than illustrative above in a statistics record in order to provide the customer with variable pricing options would fall within the scope of the scope of the present invention. Additional details regarding variable pricing options provided to the customer are described in U.S. patent application Ser. No. 10/218,730, entitled "Variable Pricing Structure for Transmitting Packets Across a Communications Link;", which is hereby incorporated herein in its entirety by reference.

In step 610, network processor subsystem 505 may determine if there is an entry in the table described above associated with the key generated in step 608. There may not be an entry in the table described above associated with the key generated in step 608 when the packets are part of a non-billable flow that is not being monitored or when the packet is the start of a new flow as discussed further below.

If there is not an entry in the table described above associated with the key generated in step 608, then, in step 611, network processor subsystem 505 may determine if the received packet is a packet indicating the start of a session between the customer, i.e., user of client 101, and server 106. In one embodiment, network processor subsystem 505 may determine if the received packet is a packet indicating the start of a session between the customer and server 106 based on the extracted packet header. For example, the extracted packet header may indicate that the packet is a first SYN (synchronize) packet from the customer.

If the packet does not indicate the start of a session, then network processor 503 may receive another packet of data from either the customer or server 106 for a particular session between the customer and server 106 in step 601. This may be the case for non-billable flow packets which are not charged to the customer. Since the customer may not be charged at least in part on receiving non-billable flow packets, there may not be an entry in the table discussed above associated with the key generated in step 608. Instead, non-billable flow packets may be charged to another entity. For example, non-billable flow packets such as content, e.g., advertisement, transmitted from server 106 to the customer via gateway 104 may not be charged to the customer but instead to the owner of server 106.

Referring to step 611, if the packet indicates the start of a session, then network processor subsystem 505, in step 612, may create an entry in the table described above associated with the key generated in step 608. Furthermore, if the packet indicates the start of a session, then network processor subsystem 505, in step 613, may create a pointer to the statistics record associated with the session entered between the customer, i.e., user of client 101, and server 106. The pointer created may be stored in the entry created in step 612. In an alternative embodiment, network processor subsystem 505 may instead of creating a pointer to the statistics record simply create a statistics record associate with the session to be stored in the created entry.

Referring to step 610, if there is an entry in the table described above associated with the key generated in step 608, then, in step 614, network processor subsystem 505 may identify the statistics record associated with the session entered between the customer, i.e., user of client 101, and server 106 using a pointer in the indexed entry. In an alternative embodiment, the key may be used by network processor subsystem 505 to identify the statistics record associated with the session entered between the customer and server 106 where the statistics record is stored in the indexed entry.

Referring to steps 613, 614, upon creating a pointer to the statistics record associated with the session entered between the customer and server 106 or upon identifying the statistics record associated with the session entered between the customer and server 106, network processor subsystem 505 may, in step 615, execute a per packet statistics update for the statistics record associated with the session entered between the customer and server 106. A per packet statistics update may include one or more of the following: time stamping arrival of the packet, updating packet count, updating byte count, determining transfer rate, determining distance packet traveled, determining quality of service, determining type of carrier service, determining size of packet. That is, a per packet statistics update may refer to network processor subsystem 505 updating or collecting (if there is no data to update) certain statistics tracked in a statistics record as described above. For example, network processor subsystem 505 may update the current number of packets or bytes received by network processor subsystem 505 by incrementing a counter. In another example, network processor subsystem 505 may determine the distance the received packet traveled as explained above in the per packet statistics update. In another example, network processor subsystem 505 may time stamp the arrival of the packet if the packet is the first packet received in the session in order to determine the starting time of the session. It is noted that network processor subsystem 505 may update or collect any type of information in a statistics record in order to provide the customer with variable pricing options. It is further noted that embodiments implementing a network processor subsystem 505 that updates or collects information in a statistics record in order to provide the customer with variable pricing options would fall within the scope of the scope of the present invention.

In step 616, a determination may be made by network processor subsystem 505 as to whether the session entered between the customer and server 106 is completed. If the session is not completed, then the edge gateway 104, e.g., gateway 104A, may receive another packet of data from either the customer or server 106 in step 601. If the session is complete, then, in step 617, network processor subsystem 505 may transmit the statistics record associated with the completed session to central billing system 105. In an alternative embodiment, network processor subsystem 505 may periodically transmit one or more statistics records associated with one or more sessions to central billing system 105 instead of transmitting a session record upon completion of the session associated with that session record. It is noted that in the alternative embodiment, network processor subsystem 505 may not transmit a statistics record unless the session associated with that statistics record is complete. Central billing system 105 may be configured to compute billing rates for a plurality of pricing options in a billing record for the customer. Each pricing option may be based upon one or more different variables including but not limited to: the number of packets transmitted per unit of time, the time the packets are transmitted, the quality of service, the traffic volume, the type of carrier service, customer attributes, the relationship between the source and destination site, the size of the packets, protocol conversions, and the number of destinations. Additional details regarding a billing record containing various billing rates for a plurality of pricing options is described in U.S. patent application Ser. No. 10/218,730, entitled "Variable Pricing Structure for Transmitting Packets Across a Communications Link,".

It is noted that steps 601-617 may be implemented by gateway 104, preferably an edge gateway 104 such as gateway 104A. It is further noted that in particular steps 601-603 may be implemented by network processor 503 of gateway 104. It is further noted that in particular steps 604-617 may be implemented by network processor subsystem 505 of gateway 104. It is further noted that method 600 may be executed in a different order presented and that the order presented in the discussion of FIG. 6 is illustrative. It is further noted that certain steps in FIG. 6, e.g., steps 612-613, may be executed almost concurrently.

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for generating variable price billing comprising the steps of:
receiving a packet of data associated with a session;
extracting a packet header from said received packet of data;
generating a key based on said extracted packet header to identify a statistics record associated with said session; and
executing a per packet statistics update for said statistics record associated with said session by a network processor subsystem in a gateway.

2. The method as recited in claim 1, wherein if said received packet of data is not a packet indicating a start of said session then the method further comprises the steps of:
indexing into a table using said generated key; and
determining if an entry in said table is associated with said generated key.

3. The method as recited in claim 1, wherein if said received packet of data is a packet indicating a start of said session then the method further comprises the step of:
determining if said received packet of data is part of a non-billable flow.

4. The method as recited in claim 3, wherein if said received packet of data is part of said non-billable flow then the method further comprises the step of:
determining whether to collect statistics on said non-billable flow.

5. The method as recited in claim 1 further comprising the steps of:
indexing into a table using said generated key; and
determining if an entry in said table is associated with said generated key.

6. The method as recited in claim 5, wherein if said generated key is not associated with an entry in said table, then the method further comprises the steps of
creating an entry in said table; and
creating a pointer to said statistics record associated with said session.

7. The method as recited in claim 5, wherein if said generated key is not associated with an entry in said table, then the method further comprises the step of:
creating said statistics record to be stored in a created entry in said table.

8. The method as recited in claim 5, wherein if said generated key is associated with said entry in said table, then the method further comprises the step of:
identifying said statistics record associated with said session using a pointer in said indexed entry.

9. The method as recited in claim 1 further comprising the step of:
transmitting said statistics record for said session to a billing system configured to compute billing rates for a plurality of pricing options in a billing record for said customer upon completion of said session.

10. The method as recited in claim 1, wherein said per packet statistics update comprises one or more of the following: time stamping arrival of packet, updating packet count, updating byte count, determining transfer rate, determining distance packet traveled, determining quality of service, determining type of carrier service, determining size of packet.

11. A computer program product embodied in a machine readable medium for generating variable price billing comprising the programming steps of
receiving a packet of data associated with a session;
extracting a packet header from said received packet of data;
generating a key based on said extracted packet header to identify a statistics record associated with said session; and
executing a per packet statistics update for said statistics record associated with said session.

12. The computer program product as recited in claim 11, wherein if said received packet of data is not a packet indicating a start of said session then the computer program product further comprises the programming steps of:
- indexing into a table using said generated key; and
- determining if an entry in said table is associated with said generated key.

13. The computer program product as recited in claim 11, wherein if said received packet of data is a packet indicating a start of said session then the computer program product further comprises the programming step of:
- determining if said received packet of data is part of a non-billable flow.

14. The computer program product as recited in claim 13, wherein if said received packet of data is part of said non-billable flow then the computer program product further comprises the programming step of:
- determining whether to collect statistics on said non-billable flow.

15. The computer program product as recited in claim 11 further comprising the programming steps of:
- indexing into a table using said generated key; and
- determining if an entry in said table is associated with said generated key.

16. The computer program product as recited in claim 15, wherein if said generated key is not associated with an entry in said table, then the computer program product further comprises the programming steps of:
- creating an entry in said table; and
- creating a pointer to said statistics record associated with said session.

17. The computer program product as recited in claim 15, wherein if said generated key is not associated with an entry in said table, then the computer program product further comprises the programming step of:
- creating said statistics record to be stored in a created entry in said table.

18. The computer program product as recited in claim 15, wherein if said generated key is associated with said entry in said table, then the computer program product further comprises the programming step of:
- identifying said statistics record associated with said session using a pointer in said indexed entry.

19. The computer program product as recited in claim 11 further comprising the programming step of:
- transmitting said statistics record for said session to a billing system configured to compute billing rates for a plurality of pricing options in a billing record for said customer upon completion of said session.

20. The computer program product as recited in claim 11, wherein said per packet statistics update comprises one or more of the following: time stamping arrival of packet, updating packet count, updating byte count, determining transfer rate, determining distance packet traveled, determining quality of service, determining type of carrier service, determining size of packet.

21. A system, comprising:
- a gateway configured to provide access to the Internet for a customer, wherein said gateway comprises:
  - a subsystem, wherein said subsystem comprises:
    - a memory unit operable for storing a computer program operable for generating variable price billing; and
    - a processor coupled to said memory unit, wherein said processor, responsive to said computer program, comprises:
      - circuitry operable for receiving a packet of data associated with a session;
      - circuitry operable for extracting a packet header from said received packet of data;
      - circuitry operable for generating a key based on said extracted packet header to identify a statistics record associated with said session; and
      - circuitry operable for executing a per packet statistics update for said statistics record associated with said session.

22. The system as recited in claim 21, wherein if said received packet of data is not a packet indicating a start of said session then said processor further comprises:
- circuitry operable for indexing into a table using said generated key; and
- circuitry operable for determining if an entry in said table is associated with said generated key.

23. The system as recited in claim 21, wherein if said received packet of data is a packet indicating a start of said session then said processor further comprises:
- circuitry operable for determining if said received packet of data is part of a non-billable flow.

24. The system as recited in claim 23, wherein if said received packet of data is part of said non-billable flow then said processor further comprises:
- circuitry operable for determining whether to collect statistics on said non-billable flow.

25. The system as recited in claim 21, wherein said processor further comprises:
- circuitry operable for indexing into a table using said generated key; and
- circuitry operable for determining if an entry in said table is associated with said generated key.

26. The system as recited in claim 25, wherein if said generated key is not associated with an entry in said table, then said processor further comprises:
- circuitry operable for creating an entry in said table; and
- circuitry operable for creating a pointer to said statistics record associated with said session.

27. The system as recited in claim 25, wherein if said generated key is not associated with an entry in said table, then said processor further comprises:
- circuitry operable for creating said statistics record to be stored in a created entry in said table.

28. The system as recited in claim 25, wherein if said generated key is associated with said entry in said table, then said processor further comprises:
- circuitry operable for identifying said statistics record associated with said session using a pointer in said indexed entry.

29. The system as recited in claim 21, wherein said processor further comprises:
- circuitry operable for transmitting said statistics record for said session upon completion of said session to a billing system coupled to said gateway, wherein said billing system is configured to compute billing rates for a plurality of pricing options in a billing record for said customer.

30. The system as recited in claim 21, wherein said per packet statistics update comprises one or more of the following: time stamping arrival of packet, updating packet count, updating byte count, determining transfer rate, determining distance packet traveled, determining quality of service, determining type of carrier service, determining size of packet.

31. The system as recited in claim 21, wherein said processor is a network processor.

* * * * *